United States Patent
Onishi et al.

(10) Patent No.: US 9,794,432 B2
(45) Date of Patent: Oct. 17, 2017

(54) IMAGE FORMING SYSTEM INCLUDING IMAGE FORMING APPARATUS AND PORTABLE TERMINAL

(71) Applicant: KYOCERA Document Solutions Inc., Osaka (JP)

(72) Inventors: Kenichi Onishi, Osaka (JP); Kohei Ishido, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/286,376

(22) Filed: Oct. 5, 2016

(65) Prior Publication Data

US 2017/0099400 A1 Apr. 6, 2017

(30) Foreign Application Priority Data

Oct. 5, 2015 (JP) .................. 2015-197512

(51) Int. Cl.
*G06F 15/00* (2006.01)
*H04N 1/00* (2006.01)

(52) U.S. Cl.
CPC ..... *H04N 1/00307* (2013.01); *H04N 1/00244* (2013.01); *H04N 2201/006* (2013.01); *H04N 2201/0039* (2013.01); *H04N 2201/0094* (2013.01)

(58) Field of Classification Search
CPC ........... H04N 1/00307; H04N 1/00244; H04N 2201/0094; H04N 2201/0039; H04N 2201/006

USPC ...................................... 358/1.15
See application file for complete search history.

(56) References Cited

U.S. PATENT DOCUMENTS

| | | | |
|---|---|---|---|
| 2007/0074257 A1* | 3/2007 | Tamura | H04N 1/00244 725/104 |
| 2014/0307282 A1 | 10/2014 | Sato et al. | |
| 2015/0365542 A1* | 12/2015 | Kim | H04N 1/00079 358/1.14 |

FOREIGN PATENT DOCUMENTS

| | | |
|---|---|---|
| JP | 2005-135051 A | 5/2005 |
| JP | 2014-207532 A | 10/2014 |

\* cited by examiner

*Primary Examiner* — Saeid Ebrahimi Dehkord
(74) *Attorney, Agent, or Firm* — Hawaii Patent Services; Nathaniel K. Fedde; Kenton N. Fedde

(57) ABSTRACT

Provided is a system that easily retrieves out various data from an image forming apparatus using a portable terminal and uses the various data. The image forming system of the present disclosure is an image forming system including an image forming apparatus that performs image formation and a portable terminal. The image forming apparatus has a non-contact IC tag. The portable terminal includes a selection part that receives selection of a maintenance screen to perform maintenance of the image forming apparatus from plural maintenance screens, a display part that displays the selected maintenance screen, a near field communication part that performs near field communication with the IC tag when the portable terminal comes close to the IC tag, and a control part that performs data communication with the image forming apparatus through the near field communication part.

12 Claims, 8 Drawing Sheets

FIG.2

| USER NAME | TRANSMISSION DATE | TRANSMISSION DATA |
|---|---|---|
| USER A | 2015/8/3/13:34 | SETTING INFORMATION OF COPY SCREEN |
| USER B | 2015/8/3/15:05 | PAPER SETTING INFORMATION |
| USER C | 2015/8/3/16:00 | SETTING INFORMATION OF SHORTCUT KEY |
| SERVICE C | 2015/8/4/10:00 | MAINTENANCE INFORMATION |
| ... | ... | ... |

| ERROR INFORMATION | MACHINE OPERATING STATE ||||| 
|---|---|---|---|---|---|
| | USE MODE | USE ENVIRONMENT | MACHINE COUNTER INFORMATION || MACHINE INFORMATION ||
| | | | NUMBER OF PRINTING SHEETS, DRUM ROTATION | NUMBER OF DRIVING TIME | MODEL NAME | 100 V POWER |
| JAM | COPY | TEMPARATURE, HUMIDITY | | | | |
| ... | ... | ... | ... | ... | ... | ... |

IMAGE FORMING SYSTEM INCLUDING IMAGE FORMING APPARATUS AND PORTABLE TERMINAL

INCORPORATION BY REFERENCE

This application is based on and claims the benefit of priority from Japanese Patent Application No. 2015-197512 filed on Oct. 5, 2015, the contents of which are hereby incorporated by reference.

BACKGROUND

The present disclosure relates to an image forming system including an image forming apparatus performing image formation and a portable terminal.

With the advance of high functionalization and multi functionalization of an image forming apparatus, a maintenance work of a serviceman is complicated. Meanwhile, a portable terminal has been widely spreading in the public, and known a system cooperating with the portable terminal. Therefore, even in the image forming apparatus, it has been longing for the advent of a technology of allowing a maintenance work using a portable terminal with which a serviceman is familiar. To this end, it has been proposed heretofore a technology where an image forming apparatus performs near field communication with a portable terminal and displays guide information of a current operation screen on the portable terminal. This enables the serviceman to perform a maintenance work by operating the image forming apparatus while looking at the guide information displayed on the portable terminal.

SUMMARY

According to one aspect of the present disclosure, the present disclosure provides an image forming system including an image forming apparatus performing image formation and a portable terminal, wherein the image forming apparatus has a non-contact IC tag; and the portable terminal includes: a selection part that receives selection of a maintenance screen to perform maintenance of the image forming apparatus from plural maintenance screens; a display part that displays the selected maintenance screen; a near field communication part that performs near field communication with the IC tag when the portable terminal comes close to the IC tag; and a control part that performs data communication with the image forming apparatus through the near field communication part, wherein when the portable terminal is brought close to the IC tag, the control part performs data communication corresponding to the maintenance screen displayed on the display part through the near field communication part with the image forming apparatus.

BRIEF DESCRIPTION OF THE DRAWINGS

FIG. 2 is a recording example of transmission history shown in FIG. 1.

FIG. 3 is an example of an error occurrence state to be stored in a solution database shown in FIG. 1.

DETAILED DESCRIPTION

Figure 1:
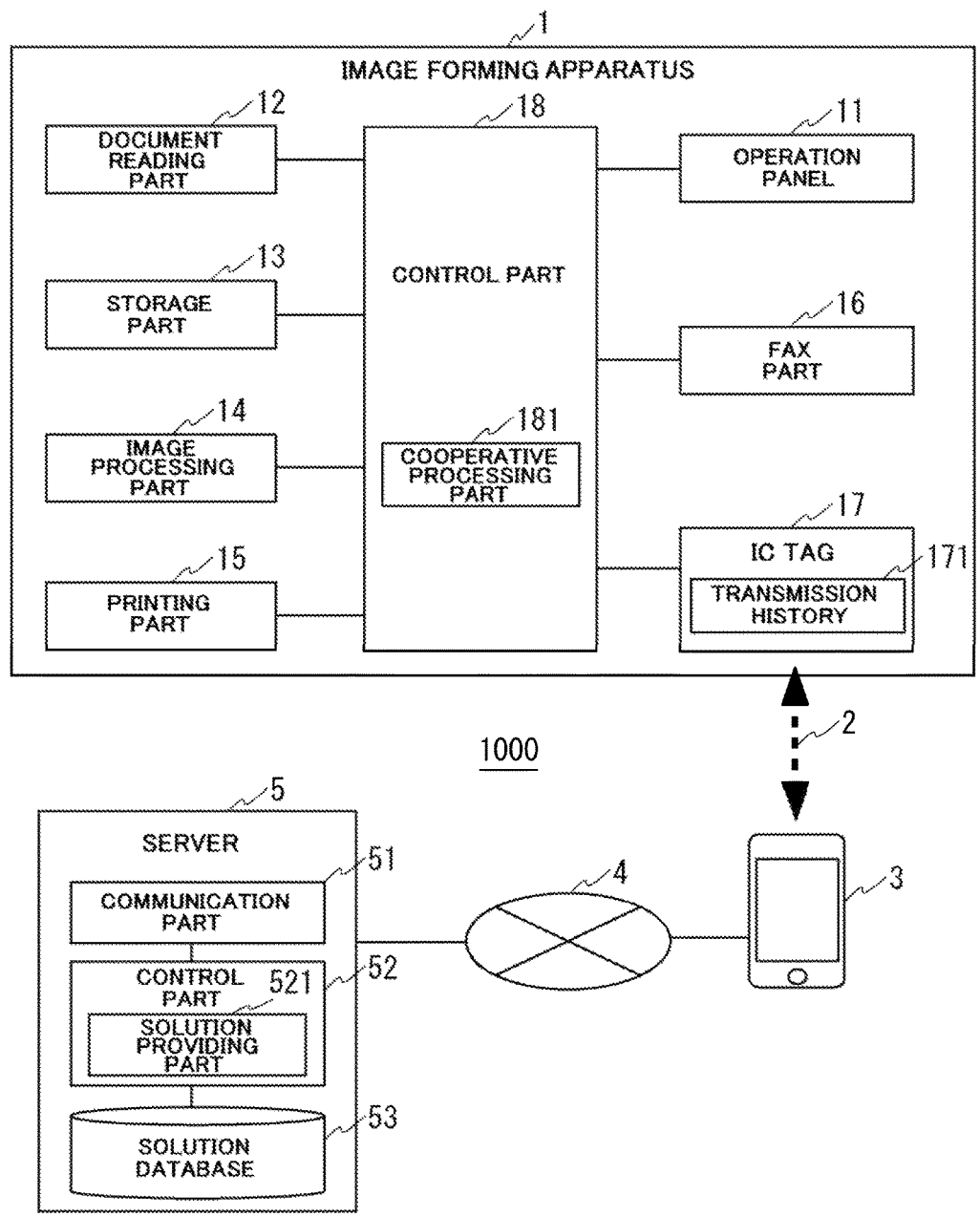
FIG. 1 is a system configuration diagram of an image forming system according to one embodiment of the present disclosure.

Hereinafter, a detailed description will be given to one embodiment of the present disclosure with reference to the accompanying drawings. In the following embodiment, a configuration exerting the same function is denoted by the same reference numeral.

As shown in FIG. 1, an image forming system 1000 includes an image forming apparatus 1 with a non-contact IC tag 17, a portable terminal 3 that performs near field communication 2 such as an NFC (Near Field Communication) with an image forming apparatus 1 via a IC tag 17, and a server 5 connected with the portable terminal 3 via a network 4.

The image forming apparatus 1 is a device having a printing function such as a printer, a copying machine, and a MFP (Multifunctional Peripheral/Printer/Product), or the like, and includes a an operation part 11, a document reading part 12, a storage part 13, an image processing part 14, a printing part 15, a fax part 16, an IC tag 17, and a control part 18.

The operation panel 11 is provided with a display part and an operation key. A user operates the operation panel 11 to input an instruction, thereby performing various settings of the image forming apparatus 1, and executing various functions such as image formation, or the like. The display part is display means such as a liquid crystal display panel that displays a state of the image forming apparatus 1, a state of the image formation, and the number of print copies, and is configured to be able to perform various instructions for color printing, monochrome printing, and duplex printing, or the like, as a touch panel on a surface of the liquid crystal panel of which a transparent pressure sensor is provided, and various settings such as magnification setting, density setting, or the like. The operation key includes a start key for instructing to start printing, a stop key for stopping processing, and a ten key.

The document reading part 12 is a scanner that emits light on a document fed by a document feeding device (not shown) and on a document mounted by a user on a platen glass, receives the reflected light, and reads a document image.

The storage part 13 is storage means such as a semiconductor memory and a HDD, or the like, and stores the image data read by the document reading device 12 and various management information.

The image processing part 14 is means for performing specific image processing to the image data. The image processing part 14 performs, for example, image improving processing such as scaling processing, density adjustment, and gradation adjustment, or the like.

The printing device 15 is printing means for printing the image data stored in the storage part 13. For example, the printing part 15 forms a latent image on a surface of a photosensitive drum based on the image data read from the storage part 13, performs image formation with a toner by converting the latent image as a toner image, transfers the toner image on a recording paper from the photosensitive drum, fixes the toner image on the recording paper, and discharges the recording paper.

The fax part 16 includes a modem. The fax part 16 has a facsimile transmission function of generating a facsimile signal from the image data read by the document reading part and the image data stored in the storage part 13 and transmitting the generated facsimile signal via a public network, and a facsimile receiving function of receiving the facsimile signal via the public network.

The IC tag 17 is a non-contact communication tag and performs near field communication 2 using a NFC or the like. At a position where the IC tag 17 is embedded, an N mark is provided so that a user becomes aware of a position over which the portable terminal 3 is held. The IC tag 17 is a passive tag with an IC chip and a coil-shaped antenna, and operates by power generated from an electrical wave emitted from the portable terminal 3. In this connection, the IC tag 17 and the N mark have only to be provided at a position where the image forming apparatus 1 can communicate with the IC tag 17 by holding the portable terminal 3 thereover, for example, they may be provided in the operation panel 11.

Further, a memory of the IC chip stores transmission history 171 in transmitting data to the portable terminal 3. For example, as shown in FIG. 2, a user name, transmission date, transmission data are stored therein as the transmission history 171. In this way, the IC chip is designed that the transmission history 171 makes a user know when and who gains access to the image forming apparatus 1 and captures data.

The control part 18 is respectively connected to the operation panel 11, the document reading part 12, the storage part 13, the image processing part 14, the printing part 15, the fax part 16, and the IC tag 17. The control part 18 is an information processing part such as a microcomputer with a ROM (Read Only Memory) and a RAM (Random Access Memory). The ROM stores a control program to perform operation control of the image forming apparatus 1. The control part 18 reads the control program stored in the ROM, and controls the whole apparatus by developing the control program on the RAM. Further, the control part 18 functions as a cooperative processing part 181 that performs various processing in cooperation with the portable terminal 3.

The server 5 includes a communication part 51, a control part 52, and a solution database 53.

The communication part 51 has a function of transmitting and receiving the various data with the portable terminal 3 via the network 4.

The solution database 53 is storage means such as a HDD, and stores an error occurrence state when an error occurs in the image forming apparatus 1 and a solution (trouble shooting) to the error occurrence state by associating with each other. As shown in FIG. 3, the error occurrence state contains an error type (for example, jam indicating the occurrence of paper jam, a C call encouraging a serviceman to take an action, or the like) and a machine operating state (use mode, use environment, machine counter value, machine information, or the like) of the image forming apparatus 1 at the time of error occurrence.

In some cases, with regard to an error occurring in the image forming apparatus 1, an error occurrence factor can be imagined by a machine operating state. For example, it is often the case that an error factor of the jam and the C call has connection with a machine counter value indicating a degree of aging of the image forming apparatus 1 (driving time and the number of printing sheets, the number of drum rotation, or the like) and with a use environment of the image forming apparatus (temperature, humidity, copy density, or the like). For example, if an error is the C call, it is often the case that a setup miss and a part initial failure are an error factor if the machine counter value is close to an initial value. In this case, a solution to solve an error is a re-setup and part replacement. Meanwhile, if an error is the jam and the machine counter value is high, it is often the case that an error results from deterioration of a roller. A solution to this instance is to replace the roller. Further, an error occurrence factor of the jam and the C call varies in accordance with the use environment such as temperature, humidity, and copy density under which the image forming apparatus 1 is used.

Therefore, the solution database 53 is designed to be able to store a solution with each of machine operating states as a key, not only an error type at the time of error occurrence, and retrieve a solution with each of the error type and the machine operating state as a key. Examples of the machine operating state include a use mode such as a copy mode and a scan mode, a use environment such as temperature and humidity, machine counter information such as the number of printing sheets, the number of drum rotation and a driving time, and machine information such as a model name and an operating voltage of the image forming apparatus 1.

The control part 52 is an information processing part such as a microcomputer with a ROM and a RAM, and the ROM stores a control program to perform operation control of the server 5. The control part 52 is respectively connected to the communication part 51 and the solution database 53, and controls the whole server 5 by developing the control program stored in the ROM on the RAM.

Further, the control part 52 functions as a solution providing part 521 that when an error occurs in the image forming apparatus 1 and an error occurrence state of the image forming apparatus 1 is transmitted via the portable terminal 3, the control part 52 retrieves a solution from the solution database 53 with the transmitted error occurrence state as a key, and transmits a found solution to the portable terminal 3. Further, the solution providing part 521 accumulates the error occurrence state of the image forming apparatus 1 transmitted from the portable terminal 3 in the solution database 53.

Figure 4:
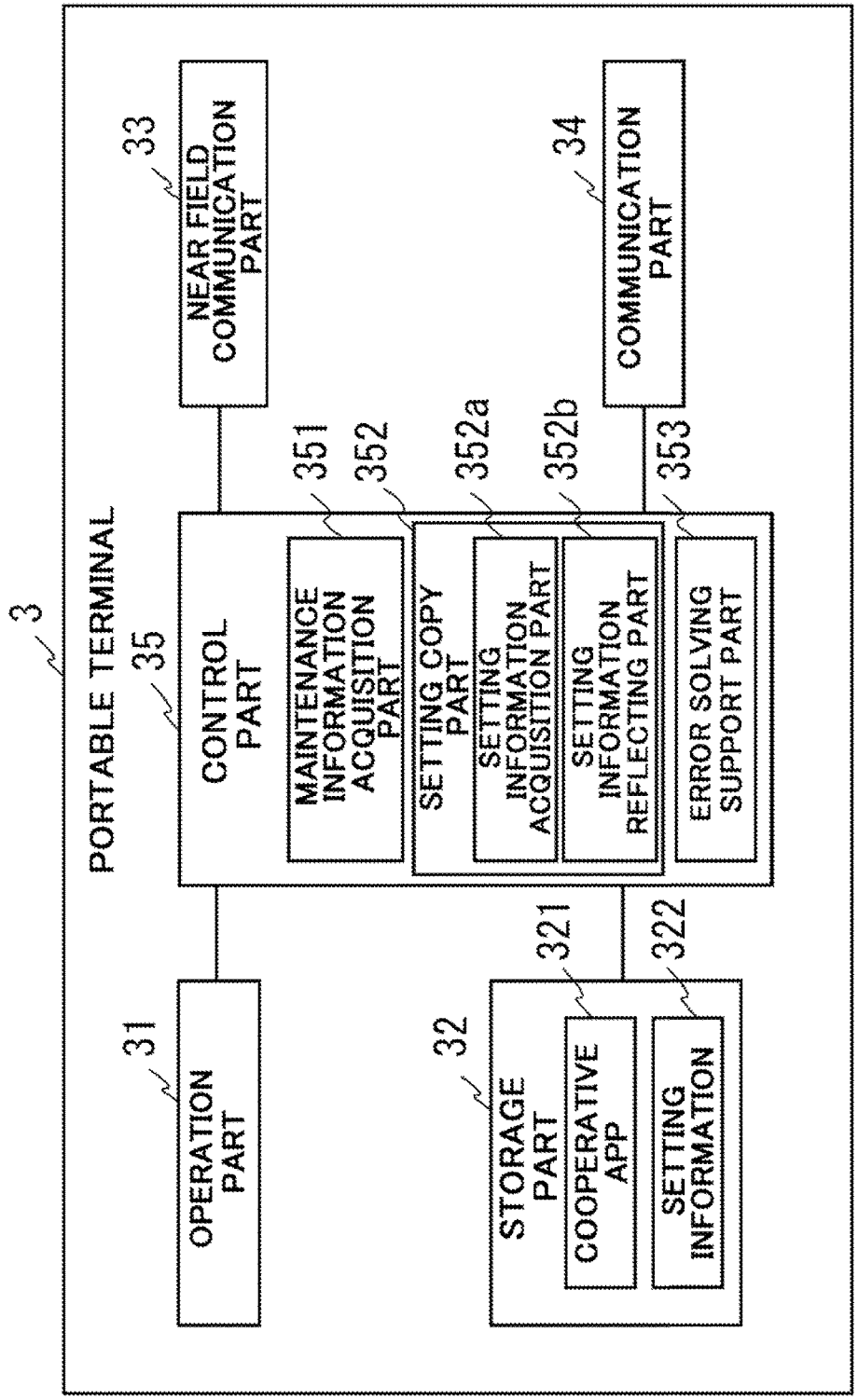
FIG. 4 is a functional block diagram showing a configuration of a portable terminal shown in FIG. 1.

Referring to FIG. 4, the portable terminal 3 includes an operation part 31, a storage part 32, a near field communication part 33, a communication part 34, and a control part 35. The portable terminal 3 is a portable device such as a cellular phone, a smartphone, a tablet terminal, a PDA (Personal Digital Assistant), or the like.

The operation part 31 is a user interface with a display part that displays various information and various operation keys. The display part may be a touch panel that functions as display means in which a transparent pressure sensitive sensor is provided on a surface of a display panel, and input means.

The storage part 32 is storage means such as a semiconductor memory and a HDD, and stores a cooperative APP 321 that implements a cooperative function with the image forming apparatus 1. The cooperative APPI 321 is an application program that causes the portable terminal 3 to be cooperated with the image forming apparatus 1, and implements a maintenance information acquisition function, a setting copy function, and a trouble shooting function to be described later. Further, the storage part 32 stores setting information 322 of the image forming apparatus 1 acquired by the setting copy function.

The near field communication part 33 is means for perform near field communication 2 with the IC tag 17 via a communication system such as the NFC (Near Field Communication) when the portable terminal 3 comes close to the IC tag 17. The near filed communication part 33 has a reader/writer function to read and write various information by performing the near field communication 2 with the IC tag 17 when the portable terminal 3 is held over the IC tag 17.

The communication part 34 has a function of transmitting and receiving various data with the server 5 via the network 4. Here, assuming that an IP address of the server 5 is previously notified to the communication part 34.

The control part 35 is respectively connected to the operation part 31, the storage part 32, the near field communication part 33, and the communication part 34, and performs operation control of the whole portable terminal 3 in accordance with specific instruction information input from the operation part 31. The control part 35 is an information processing part such as a microcomputer with a ROM and a RAM. The ROM stores a control program to perform operation control of the portable terminal 3. The control part 35 reads the control program stored in the ROM, and controls the whole terminal in accordance with the specific instruction information input from the operation part 31 by developing the operation program on the RAM.

Further, the control part 35 functions as a maintenance information acquisition part 351 that implements a maintenance information acquisition function by developing the cooperative APP 321 on the RAM, a setting copy part 352 that implements a setting copy function, and an error solving support part 353 that implements a trouble shooting function. Moreover, the setting copy part 352 functions as a setting information acquisition part 352a that acquires setting information 322 of a setting screen from the image forming apparatus 1, and a setting information reflecting part 352b that transmits the setting information 322 acquired by the setting information acquiring part 352a to the image forming apparatus 1 and displays a setting screen on which the setting information 322 is reflected.

Hereinbelow, a description will be given in order to the maintenance information acquisition function, the setting copy function, and the trouble shooting function. Note that since the maintenance information acquisition function and the setting copy function dispense with the server 5, the server 5 may be excluded from the image forming apparatus 1.

[1] Maintenance Information Acquisition Function

The maintenance information acquisition function is a function of allowing easy acquisition of maintenance information (counter value of a replacement part, the number printing sheets, or the like) correspondingly with a specific maintenance item from the image forming apparatus 1 when a serviceman visited for maintenance of the image forming apparatus 1. When the serviceman holds the portable terminal 3 over an N mark of the image forming apparatus 1 in a state where a maintenance information acquisition screen is displayed on the portable terminal 3, the maintenance information is transmitted from the image forming apparatus 1 to the portable terminal 3 via the IC tag 17.

[2] Setting Copy Function

The setting copy function is a function of acquiring the setting information 322 of a setting screen displayed on the image forming apparatus 1, and reflecting the setting information 322 in the desired image forming apparatus 1.

When a serviceman performs setting in a state where a desired setting screen such as a copy mode and a scan mode is displayed on the operation panel 11, and holds the portable terminal 3 on an N mark, the setting information 322 on the setting screen is transmitted to the portable terminal 3 via the IC tag 17. If there are plural image forming apparatuses 1, when holding the portable terminal 3 over an N mark of the image forming apparatus 1 that a serviceman wants to be operated under the same setting condition, the setting information 322 is transmitted from the portable terminal 3 via the IC tag 17, and a setting screen in which the setting information 322 is reflected is displayed on the operation panel 11 of the image forming apparatus 1. This enables, for example, a shortcut key setting, a paper size setting, a maintenance setting, and mode settings such as a copy mode to be copied among the plural image forming apparatuses 1. Further, because the setting information 322 is stored in the portable terminal 3, a previously used setting can reflect at any time in the image forming apparatus 1 by carrying the portable terminal 3 by a serviceman. Alternatively, not necessarily limited to the serviceman, a general user may store favorite setting information 322 in the portable terminal 3, and reflect the favorite setting information 322 in the image forming apparatus 1 at the timing of using the image forming apparatus 1. This enables the favorite setting information 322 to be easily reflected at any time in the image forming apparatus 1 even when the image forming apparatus 1 is shared among plural users.

[3] Trouble Shooting Function at the Time of Error Occurrence

The trouble shooting function is a function of displaying a solution corresponding to errors on the portable terminal 3 and supports an error solving work of a serviceman when an error such as defects occurs in the image forming apparatus 1 and an error screen is displayed on the operation panel 11.

Figure 5:
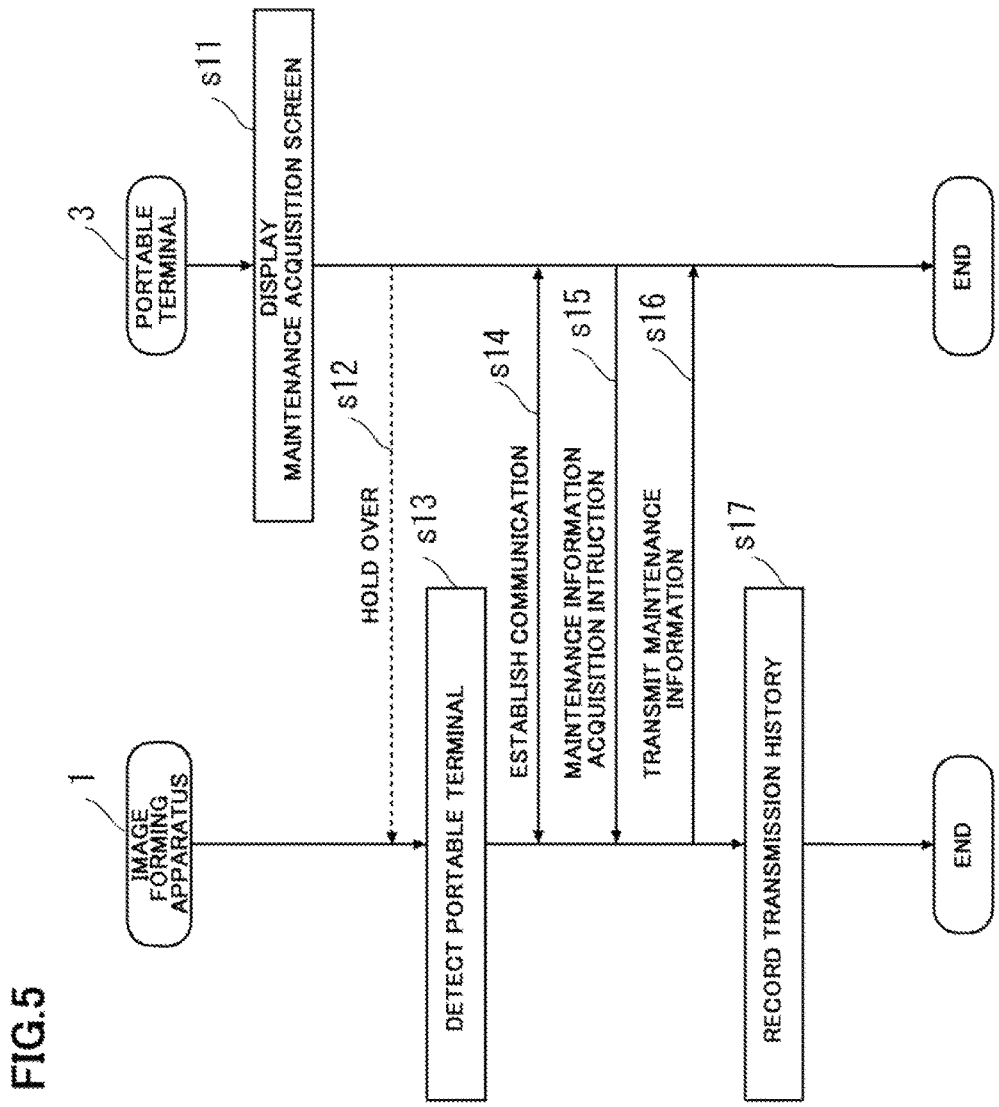
FIG. 5 is a flowchart showing a flow of maintenance information acquisition processing of the image forming system shown in FIG. 1.
Figure 6:
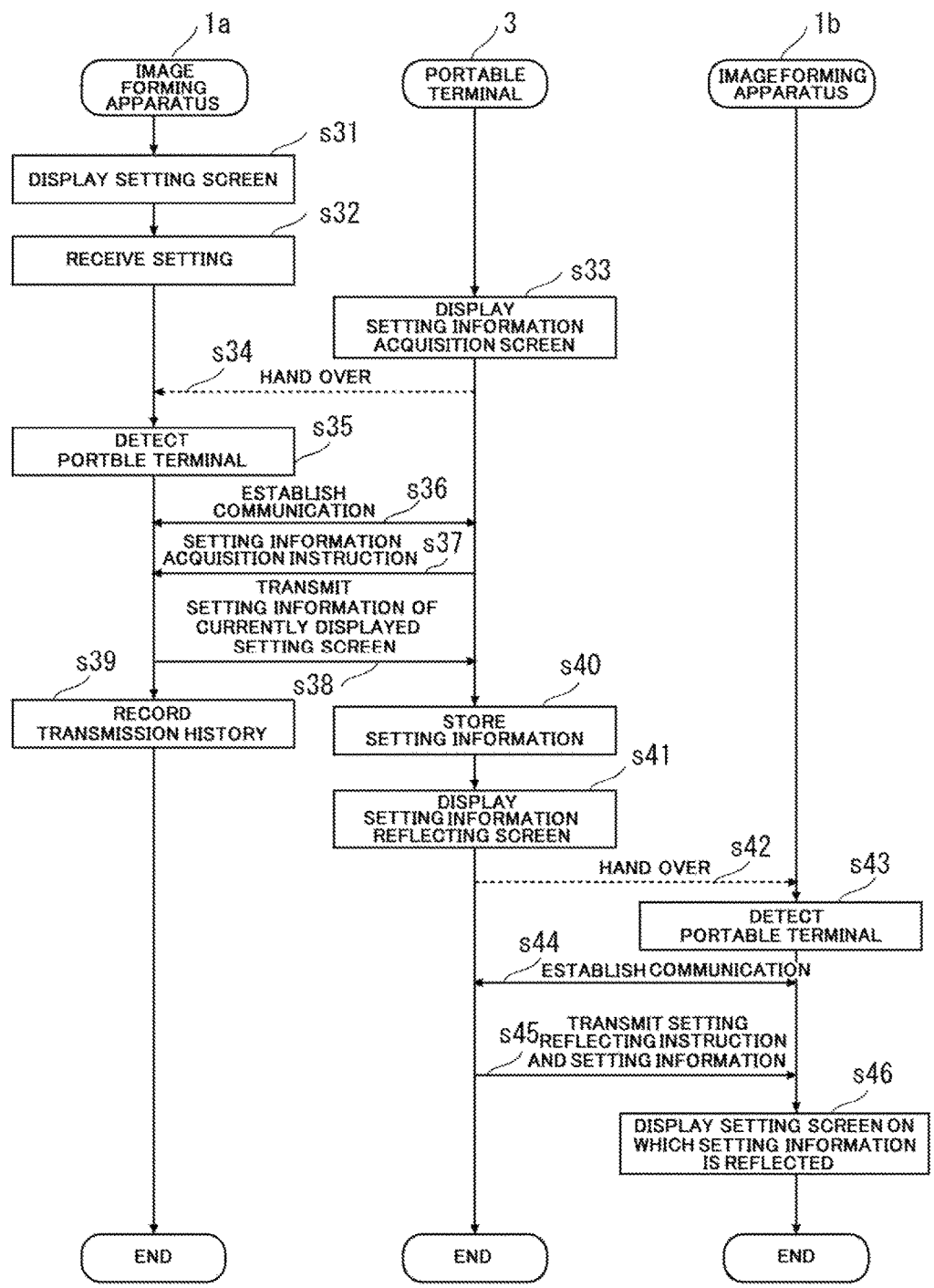
FIG. 6 is a flowchart showing a flow of setting copy processing of the image forming system shown FIG. 1.

A specific description will be given to a flow of processing implementing the maintenance information acquisition function, the setting copy function, and the trouble shooting function with reference to FIG. 5 to FIG. 7.

A description will first be given to a flow of processing implementing the maintenance information acquisition function with reference to FIG. 5.

First, if a maintenance information acquisition screen is selected by a serviceman via the operation part 31, the maintenance information acquisition part 351 displays the maintenance information acquisition screen on the operation part 31 (step S11). Then, if the portable terminal 3 is held over an N mark (step S12), the portable terminal 3 is detected via the IC tag 17 (step S13), and communication between the IC tag 17 and the portable terminal 3 is established (step S14). Once communication is established, the maintenance information acquisition part 351 transmits a maintenance information acquisition instruction correspondingly with the maintenance information acquisition screen (step S15). The corporative processing part 181 of the image forming apparatus 1 transmits maintenance information of an item previously determined via the IC tag 17 to the portable terminal 3 in accordance with the transmitted maintenance information acquisition instruction (step S16). If the maintenance information is transmitted, the IC tag 17 stores the transmission history 171 containing a destination user name, transmission date and time, and transmission data in a memory of an IC chip (step S17), and terminates the processing. Here, assuming that the destination user name is able to be specified via the near field communication 2 with the portable terminal 3.

This enables a serviceman to transmit the maintenance information necessary for a maintenance operation to the portable terminal 3, only by performing an acquisition operation (display operation of maintenance information acquisition screen) of the maintenance information by the portable terminal 3 and holding the portable terminal 3 over an N mark without operating the image forming apparatus 1.

Subsequently, a description will be given to a flow of processing implementing the setting copy function with reference to FIG. 6. Here, a description will be given by taking a case as an example where setting information is acquired from the image forming apparatus 1*a* and the setting information is reflected in the image forming apparatus 1*b*.

First, the control part 18 of the image forming apparatus 1*a* displays a setting screen on the operation panel 11 in accordance with an operation of a serviceman (step S31), and receives the setting on the setting screen (step S32). Then, if a setting information acquisition screen is selected by a serviceman via the operation part 31, the setting information acquisition part 352*a* of the portable terminal 3 displays the setting information acquisition screen on the operation part 31 (step S33), and holds the portable terminal 3 over an N mark (step S34). If the portable terminal 3 is detected via the IC tag 17 (step S35), communication between the IC tag 17 and the portable terminal 3 is established (step S36). Once communication is established, the setting information acquisition part 352*a* transmits a setting information acquisition instruction to the image forming apparatus 1*a* via the IC tag 17 (step S37). The cooperative processing part 181 of the image forming apparatus 1*a* transmits the setting information 322 of the currently displayed screen to the portable terminal 3 in accordance with the setting information acquisition instruction via the IC tag 17 (step S38). The IC tag 17 stores the transmission history 171 in a memory of the IC chip (step S39), and terminates the processing. Further, the setting information acquisition part 352*a* stores the setting information 322 transmitted from the image forming apparatus 1*a* in the storage part 32 (step S40).

Then, if the setting information 322 is reflected in the image forming apparatus 1*b*, a serviceman causes the setting information reflecting part 352*b* to display a setting information reflecting screen on the portable terminal 3 via the operation part 31 (step S41), the serviceman holds the portable terminal 3 over an N mark of the image forming apparatus 1*b* on which the serviceman wants to reflect the setting (step S42). Then, the image forming apparatus 1*b* detects the portable terminal 3 via the IC tag 17 (step S43), and communication between the IC tag 17 and the portable terminal 3 is established (step S44). Once communication is established, the setting information reflecting part 352*b* transmits the setting information 322 stored in the storage part 32 together with a setting reflecting instruction to the image forming apparatus 1*b* (step S45), and terminates the processing. When a setting reflecting instruction and the setting information 322 are transmitted from the portable terminal 3, the corporation processing part 181 of the image forming apparatus 1*b* displays a setting screen in which the setting information 322 is reflected on the operation panel 11 (step S46), and terminates the processing.

Since this enables a serviceman to easily reflect the setting information 322 set in a maintenance of the image forming apparatus 1*a* in the image forming apparatus 1*b*, it allows a maintenance work (reflection of maintenance setting value, or the like) to be performed quickly and easily. It is needless to say that the setting information 322 may be reflected in the same image forming apparatus 1.

Figure 7:
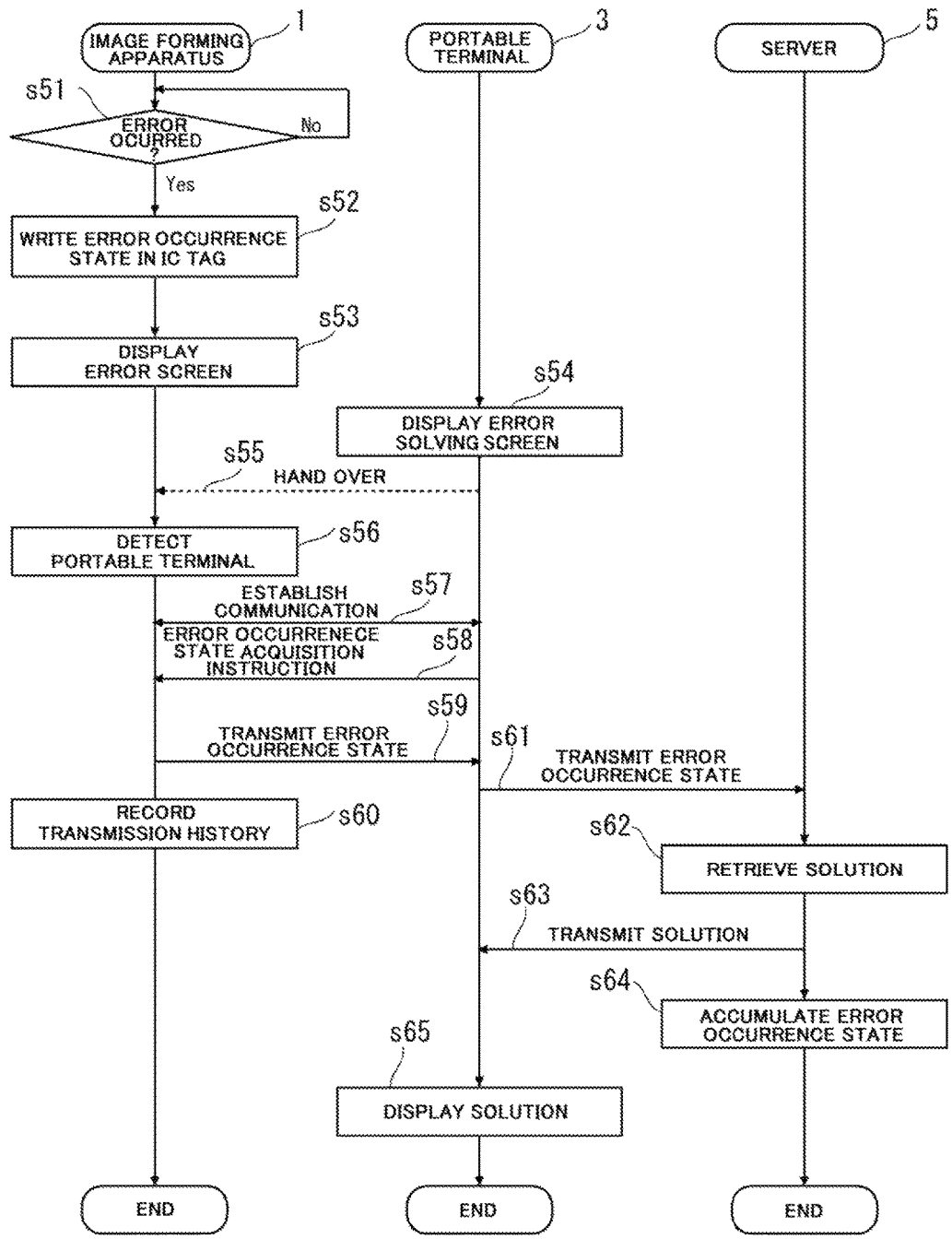
FIG. 7 is a flowchart showing a flow of trouble shooting processing of the image forming system shown in FIG. 1.

A description will then given to a flow of processing implementing a trouble shooting function with reference to FIG. 7.

The control part 18 of the image forming apparatus 1 waits until an error occurs (step S51, step S51:No). If an error occurs (step S51:Yes), the control part 18 writes an error occurrence state in the IC tag 17 (step S52). Subsequently, the control part 18 displays an error screen notifying an error on the operation panel 11(step S53). Then, the error solving support part 353 causes the operation part 31 to display an error solving screen on the operation part 31 in accordance with an operation of a serviceman who knew that an error occurred (step S54). Then, if the serviceman holds the portable terminal 3 over an N mark (step S55), the portable terminal 3 is detected via the IC tag 17 (step S56), and communication between the IC tag 17 and the portable terminal 3 is established (step S57). Once communication is established, the error solving support part 353 transmits an error occurrence state acquisition instruction (step S58). In accordance with the error occurrence state acquisition instruction, an error occurrence state stored in the IC tag 17 is transmitted to portable terminal 3 (step S59), and the transmission history 171 is recorded in the IC tag 17 (step S60). After that, the error solving support part 353 transmits the transmitted error occurrence state to the server 5 via the network 4(step S61).

The solution providing part 521 of the server 5 retrieves whether or not an error occurrence state identical with or similar to the error occurrence state transmitted from the portable terminal 3 is accumulated in the solution database 53 (step S62). The solution providing part 521 acquires, as a result of retrieval, a solution corresponding to the relevant error occurrence state from the solution database 53, and transmits the solution to portable terminal 3 via the network 4 (step S63). Then, the solution providing part 521 accumulates the error occurrence state transmitted from the portable terminal 3 in the solution database 53 (step S64), and terminates the processing. In this connection, if the solution providing part 521 finds, as a result of retrieval, plural solutions, the solution providing part 521 transmits the plural solutions to the portable terminal 3, with priority being given, in the order in which a condition is close to the error occurrence state of the image forming apparatus 1.

The error solving support part 353 of the portable terminal 3 displays the solutions transmitted from the server 5 on the operation part 31, and terminates the processing.

Thereby, since a solution corresponding to the error occurrence state occurred in the image forming apparatus 1 is displayed on the portable terminal 3, this enables a serviceman to solve accurately in a short time an error of the image forming apparatus 1 based on the displayed solution. Further, the error occurrence state is written in the IC tag 17 at the time of error occurrence. Thus, the error solving support part 353 can read the error occurrence state from the IC tag 17 even in a state where an error is occurred such that power of the image forming apparatus 1 is not turned on, regardless of whether the power of the image forming apparatus 1 is turned on or the power thereof is turned off, which transmits the error occurrence state to the server 5, thereby acquiring an accurate solution.

In other words, when a serviceman holds the portable terminal 3 over an N mark in a state where a maintenance screen is displayed on the operation part 31 by selecting one of a maintenance information acquisition screen, a setting information acquisition screen, a setting information reflecting screen, and an error solving screen as the maintenance screen to perform maintenance of the image forming apparatus 1, it enables data corresponding to the selected maintenance screen to be transmitted from the image forming apparatus 1 to the portable terminal 3 via the IC tag 17.

Thus, in the image forming system 1000 according to the present embodiment, the image forming apparatus 1 has the non-contact IC tag 17, and the portable terminal 3 includes the selection part (operation part 31) that receives a selection of the maintenance screen to perform maintenance of the image forming apparatus 1 from plural maintenance screens, the display part (operation part 31) that displays the selected maintenance screen, the near field communication part 33 that performs near field communication 2 with the IC tag 17 when the portable terminal 3 comes close to the IC tag 17, and the control part 35 that performs data communication with the image forming apparatus 1 by the near field communication part 33. Then, when the portable terminal 3 is brought close to the IC tag 17, the control part 35 performs data communication corresponding to a maintenance screen displayed on the display part by the near field communication part 33 with the image forming apparatus 1. Therefore, in the present embodiment, it is capable of easily retrieving various data from the image forming apparatus 1 using the portable terminal 3 and utilizing the various data.

When the portable terminal 3 is brought close to the IC tag 17 in a state where a setting information acquisition screen (first maintenance screen) to acquire the setting information 322 from the image forming apparatus 1 is displayed, the control part 35 functions as the setting information acquisition part 352a that acquires the setting information 322 of the image forming apparatus 1 by the near field communication part 33. Further, when the portable terminal 3 is brought close to the IC tag 17 in a state where a setting information reflecting screen (second maintenance screen) to reflect the setting information 322 in the image forming apparatus 1 is displayed, the control part 35 functions as the setting information reflecting part 352b that transmits the setting information 322 acquired by the setting information acquisition part 352a through the near field communication part 33. Then, the image forming apparatus 1 reflects the setting information 322 transmitted via the IC tag 17. Therefore, in the present embodiment, a serviceman can copy the setting information 322 among plural image forming apparatuses 1, thereby allowing an easy reflection work of the setting value.

Further, the setting information 322 acquired by the setting information acquisition part 352a is stored in the storage part 32 of the portable terminal 3. Therefore, not limited to a serviceman, even a general user can use the image forming apparatus 1 using the favorite setting information 322, by previously storing the favorite setting information 322 in the portable terminal 3 even in the general user, by a simple operation of holding the portable terminal 3 over the IC tag 17 of the image forming apparatus 1, even when plural users uses the image forming apparatus 1.

When the portable terminal 3 is brought close to the IC tag 17 in a state where a maintenance information acquisition screen (third maintenance screen) to acquire maintenance information from the image forming apparatus 1 is displayed, the control part 35 functions as the maintenance information acquisition part 351 that acquires maintenance information of a previously determined item by the near field communication part 33 from the image forming apparatus 1. Therefore, it enables a serviceman to acquire the maintenance information necessary for maintenance merely by holding the portable terminal 3 over the IC tag 17 without operating the image forming apparatus 1, thereby confirming the maintenance information using the portable terminal 3 with which the serviceman is familiar.

The image forming apparatus 1000 includes the server 5 that is connected to the network 4, and stores plural solutions correspondingly with an error occurrence state of the image forming apparatus 1. The portable terminal 3 includes the communication part 34 that performs data communication with the server 5 via the network 4. If an error occurs in the image forming apparatus 1, when the portable terminal 3 is brought close to the IC tag 17 in a state where an error solving screen (fourth maintenance screen) to acquire a solution to the error is displayed, the control part 35 functions as the error solving support part 353 that acquires an error occurrence state at the time of error occurrence from the image forming apparatus 1 through the near field communication part 33, acquires a solution corresponding to an error occurrence state from the server 5 through the communication part 34, and displays the solution on the display part. Therefore, because an accurate solution corresponding to the error occurrence state occurred in the image forming apparatus 1 is displayed on the portable terminal 3, it enables a serviceman to solve an error in a short time.

The error occurrence state contains an error type, a use environment of the image forming apparatus 1 at the time of error occurrence, and a machine counter value. The server 5 includes a solution providing part 521 that transmits a solution to the portable terminal 3 based on the use environment and the machine counter value if an error is jam or a C call necessary to take an action by a serviceman. Therefore, the serviceman can acquire by the portable terminal 3 a solution corresponding to a machine state at the time of error occurrence.

Because the IC tag 17 records the transmission history 171 of data communication, a serviceman can confirm when and who retrieves the data from the image forming apparatus 1.

While in the above embodiment, a description is given by taking a case as an example where the data is transmitted from the image forming apparatus 1 to the portable terminal 3 in accordance with a display screen displayed on the portable terminal 3, the data may be transmitted from the image forming apparatus 1 to the portable terminal 3 in accordance with the display screen displayed on the operation panel 11 of the image forming apparatus 1.

Figure 8:
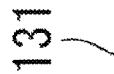
FIG. 8 is a view showing transmission target data to be transmitted to a portable terminal correspondingly with a display screen of an operation panel when the portable terminal comes close to an IC tag.

In this case, for example, as shown in FIG. 8, a screen setting table 131 in which a display screen to be displayed on the operation panel 11 and transmission target data to be transmitted to the portable terminal 3 are associated with each other is previously stored in the storage part 13. The screen setting table 131 may be set by a user. For example, an address book may be registered as the transmission target data corresponding to a fax transmission screen. When the portable terminal 3 comes close to the IC tag 17 in a state where either of display screens of the screen setting table 131 is displayed on the operation panel 11, the cooperative processing part 181 transmits the transmission target data corresponding to a display screen displayed on the operation panel 11 to the portable terminal 3 via the IC tag 17 based on the screen setting table 131. Therefore, if a serviceman looks at a display screen displayed on the operation panel 11 and wants to acquire the data, the serviceman can easily acquire the data corresponding to the display screen, only by holding the portable terminal 3 over an N mark.

In a maintenance work, it is not seldom that various data such as maintenance information is retrieved from the image forming apparatus, and a maintenance work is performed while confirming the maintenance information. However, in a typical technology, there remains a problem that it needs to operate the image forming apparatus while looking at guide information displayed on the portable terminal and retrieve various data, and thus an operation is complicated. Hence, there has been a need for retrieving more easily the various data from the image forming apparatus using the portable terminal and using the various data.

The present disclosure is made in view of the above problem, and an object thereof is to provide a technology in which various data can be retrieved easily from the image forming apparatus using the portable terminal and use the various data.

According to the present disclosure, the disclosure provides a technology of easily retrieving various data from the image forming apparatus using the portable terminal, and utilizing the various data.

It goes without saying that the present disclosure is not necessarily limited to the aforesaid embodiment, but rather various modification may be made within a range not departing from the spirit of the present disclosure.

What is claimed is:

1. An image forming system including an image forming apparatus performing image formation and a portable terminal,
wherein
the image forming apparatus has a non-contact IC tag; and
the portable terminal includes:
a selection part that receives selection of a maintenance screen to perform maintenance of the image forming apparatus from plural maintenance screens;
a display part that displays the selected maintenance screen;
a near field communication part that performs near field communication with the IC tag when the portable terminal comes close to the IC tag; and
a control part that performs data communication with the image forming apparatus through the near field communication part,
wherein
when the portable terminal is brought close to the IC tag, the control part performs data communication corresponding to the maintenance screen displayed on the display part through the near field communication part with the image forming apparatus; and
wherein when the portable terminal is brought close to the IC tag in a state where a third maintenance screen to acquire the maintenance information from the image forming apparatus is displayed, the control part functions as a maintenance information acquisition part that acquires from the image forming apparatus maintenance information of an item previously determined by the near field communication part.

2. The image forming system including the image forming apparatus according to claim 1, wherein
when the portable terminal is brought close to the IC tag in a state where a first maintenance screen to acquire setting information from the image forming apparatus, the control part functions as a setting information acquisition part that acquires the setting information of the image forming apparatus through the near field communication part,
when the portable terminal is brought close to the IC tag in a state where a second maintenance screen to reflect the setting information in the image forming apparatus is displayed, the control part functions as a setting information reflecting part that transmits the setting information acquired by the setting information acquisition part through the near field communication part, and
the image forming apparatus reflects the setting information transmitted via the IC tag.

3. The image forming system including the image forming apparatus according to claim 2, wherein the portable terminal includes a storage part that stores the setting information acquired by the setting information acquisition part.

4. The image forming system including the image forming apparatus according to claim 1, wherein the IC tag records transmission history of the data communication.

5. The image forming system including the image forming apparatus according to claim 1, further comprising:
an operation panel that displays one of plural display screens;
a screen setting table that associates and stores data to be transmitted to the portable terminal correspondingly with the display screen to be displayed on the operation panel; and
a cooperative processing part that when the portable terminal is brought close to the IC tag, transmits the data corresponding to the display screen displayed on the operation panel to the portable terminal via the IC tag based on the screen setting table.

6. An image forming system including an image forming apparatus performing image formation and a portable terminal,
wherein
the image forming apparatus has a non-contact IC tag; and
the portable terminal includes:
a selection part that receives selection of a maintenance screen to perform maintenance of the image forming apparatus from plural maintenance screens;
a display part that displays the selected maintenance screen;
a near field communication part that performs near field communication with the IC tag when the portable terminal comes close to the IC tag; and
a control part that performs data communication with the image forming apparatus through the near field communication part,
wherein
when the portable terminal is brought close to the IC tag, the control part performs data communication corresponding to the maintenance screen displayed on the display part through the near field communication part with the image forming apparatus,
the image forming system further comprises a server that is connected to a network and stores plural solutions correspondingly with an error occurrence state of the image forming apparatus
the portable terminal includes a communication part that performs data communication with the server via the network, and
if an error occurs in the image forming apparatus, when the portable terminal is brought close to the IC tag in a state where a fourth maintenance screen to acquire a solution to the error, the control part functions as an error solving support part that acquires an error occurrence state at the time of the error occurrence from the image forming apparatus through the near field communication part, acquires the solution corresponding to the error occurrence state from the server through the communication part, and displays the solution on the display part.

7. The image forming system including the image forming apparatus according to claim 6, wherein
when the error occurs, the image forming apparatus writes the error occurrence state in the IC tag, and
when the portable terminal is brought close to the IC tag in a state where the fourth maintenance screen is displayed, the error solving support part acquires the error occurrence state written in the IC tag through the near field communication, irrespective of a power state of the image forming apparatus.

8. The image forming system including the image forming apparatus according to claim 6, wherein the error occurrence state contains an error type, a use environment, and a machine counter value in the image forming apparatus at the time of the error occurrence, and
if the error is jam or a C call necessary to take an action by a serviceman, the server includes a solution providing part that transmits the solution to the portable terminal based on the use environment and the machine counter value.

9. The image forming system including the image forming apparatus according to claim 6, wherein
when the portable terminal is brought close to the IC tag in a state where a first maintenance screen to acquire setting information from the image forming apparatus, the control part functions as a setting information acquisition part that acquires the setting information of the image forming apparatus through the near field communication part,
when the portable terminal is brought close to the IC tag in a state where a second maintenance screen to reflect the setting information in the image forming apparatus is displayed, the control part functions as a setting information reflecting part that transmits the setting information acquired by the setting information acquisition part through the near field communication part, and
the image forming apparatus reflects the setting information transmitted via the IC tag.

10. The image forming system including the image forming apparatus according to claim 9, wherein the portable terminal includes a storage part that stores the setting information acquired by the setting information acquisition part.

11. The image forming system including the image forming apparatus according to claim 6, wherein the IC tag records transmission history of the data communication.

12. The image forming system including the image forming apparatus according to claim 6, further comprising:
an operation panel that displays one of plural display screens;
a screen setting table that associates and stores data to be transmitted to the portable terminal correspondingly with the display screen to be displayed on the operation panel; and
a cooperative processing part that when the portable terminal is brought close to the IC tag, transmits the data corresponding to the display screen displayed on the operation panel to the portable terminal via the IC tag based on the screen setting table.

* * * * *